(12) United States Patent
Valvano et al.

(10) Patent No.: US 7,331,430 B2
(45) Date of Patent: Feb. 19, 2008

(54) MULTI-DISC BRAKE WITH FIXED CENTER BRAKE PAD ASSEMBLY

(75) Inventors: Thomas V. Valvano, Saginaw, MI (US); Marshall D. Snyder, Birch Run, MI (US)

(73) Assignee: Delphi Technologies, Inc., Troy, MI (US)

( * ) Notice: Subject to any disclaimer, the term of this patent is extended or adjusted under 35 U.S.C. 154(b) by 226 days.

(21) Appl. No.: 11/325,705

(22) Filed: Jan. 5, 2006

(65) Prior Publication Data

US 2007/0151813 A1    Jul. 5, 2007

(51) Int. Cl.
F16D 55/36    (2006.01)

(52) U.S. Cl. .................... 188/71.5; 188/73.1; 188/71.1

(58) Field of Classification Search ............... 188/17, 188/18 R, 26, 71.5, 71.1, 218 XL, 73.1
See application file for complete search history.

(56) References Cited

U.S. PATENT DOCUMENTS

| | | | |
|---|---|---|---|
| 4,576,255 A | 3/1986 | Mery et al. | |
| 4,598,799 A | 7/1986 | Thioux | |
| 4,784,244 A | 11/1988 | Carre et al. | |
| 4,844,206 A | 7/1989 | Casey | |
| 4,865,160 A | 9/1989 | Casey | |
| 5,069,314 A | 12/1991 | Madzgalla et al. | |
| 5,472,068 A | 12/1995 | Weiler et al. | |
| 5,931,268 A | 8/1999 | Kingston et al. | |
| 6,003,641 A | 12/1999 | Boehringer et al. | |
| 6,244,391 B1 | 6/2001 | Bunker | |
| 6,371,250 B1 | 4/2002 | Bunker | |
| 6,508,338 B1 | 1/2003 | Bunker | |
| 6,508,340 B1 | 1/2003 | Bunker | |
| 6,520,296 B1 | 2/2003 | Bunker | |
| 6,640,937 B2 | 11/2003 | Bunker | |
| 6,705,434 B1 | 3/2004 | Bunker | |
| 6,843,350 B2 | 1/2005 | Larkin et al. | |
| 6,915,882 B2 | 7/2005 | Thorpe | |
| 6,945,370 B1 | 9/2005 | Bunker | |
| 2006/0081426 A1* | 4/2006 | Challenor | 188/218 XL |

* cited by examiner

*Primary Examiner*—Melanie Torres
(74) *Attorney, Agent, or Firm*—Scott A. McBain

(57) ABSTRACT

The invention provides a multi-disc brake for a vehicle having a knuckle for supporting a wheel of a vehicle and a hub mounted for rotation on the knuckle about a rotation axis. The multi-disc brake also includes a pair of discs mounted for rotation with and sliding movement on the hub along the rotation axis. Each disc includes inboard and outboard engaging surfaces. The multi-disc brake also includes a plurality of brake pad assemblies disposed in alternating arrangement between the discs. The multi-disc brake also includes a caliper disposed for sliding movement relative to the knuckle and having an inboard wall and a bridge portion extending from the inboard wall around the discs and the brake pad assemblies to an outboard wall adjacent to the outboard brake pad assembly. An actuator is disposed between the inboard wall of the caliper and the inboard brake pad assembly for urging the inboard brake pad assembly and the inboard wall apart to urge the brake pad assemblies and the discs together to slow rotation of the hub. The multi-disc brake also includes a guide fixed relative to the knuckle for guiding sliding movement of the inboard brake pad assembly and the outboard brake pad assembly wherein the center brake pad assembly being fixed to the guide for limiting taper of the brake pad assemblies.

7 Claims, 4 Drawing Sheets

MULTI-DISC BRAKE WITH FIXED CENTER BRAKE PAD ASSEMBLY

FIELD OF THE INVENTION

The invention relates to a brake for a vehicle and more specifically to a brake having multiple discs.

BACKGROUND OF THE INVENTION

Vehicles can have hub supports known as stub axles or steering knuckles. These structures support a hub for rotation about an axis. The hub can support the wheel of the vehicle, such as a carrying wheel or a steered wheel. Disc brakes can be associated with the hub to slow rotation of the wheel supported on the hub. One or more discs are fixed for rotation to the hub and are slowed by one or more brake pad assemblies having backing plates and friction material pads which engage opposite surfaces of the one or more discs. A piston and cylinder assembly can be used to bring the brake pad assemblies into force-applying engagement with the one or more discs.

SUMMARY OF THE INVENTION AND ADVANTAGES

The invention provides a multi-disc brake for a vehicle. The multi-disc brake includes a knuckle for supporting a wheel of a vehicle. The multi-disc brake also includes a hub mounted for rotation on the knuckle about a rotation axis. The multi-disc brake also includes an inboard disc mounted for rotation with the hub and for sliding movement on the hub along the rotation axis. The inboard disc includes a first inboard engaging surface and a first outboard engaging surface. The multi-disc brake also includes an outboard disc mounted for rotation with the hub and for sliding movement on the hub along the rotation axis. The outboard disc includes a second inboard engaging surface and a second outboard engaging surface. The multi-disc brake also includes an inboard brake pad assembly disposed adjacent to the inboard engaging surface of the inboard disc for sliding movement along the rotation axis relative to the hub. The multi-disc brake also includes an outboard brake pad assembly disposed adjacent to the outboard engaging surface of the outboard disc for sliding movement along the rotation axis relative to the hub. The multi-disc brake also includes a center brake pad assembly disposed between the outboard engaging surface of the inboard disc and the inboard engaging surface of the outboard disc. The multi-disc brake also includes a caliper disposed for sliding movement relative to the knuckle and having an inboard wall and a bridge portion extending from the inboard wall around the discs and the brake pad assemblies to an outboard wall adjacent to the outboard brake pad assembly. The multi-disc brake also includes an actuator disposed between the inboard wall of the caliper and the inboard brake pad assembly for urging the inboard brake pad assembly and the inboard wall apart to urge the brake pad assemblies and the discs together to slow rotation of the hub. The multi-disc brake also includes a guide fixed relative to the knuckle for guiding sliding movement of the inboard brake pad assembly and the outboard brake pad assembly wherein the center brake pad assembly being fixed to the guide for limiting taper of the brake pad assemblies.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
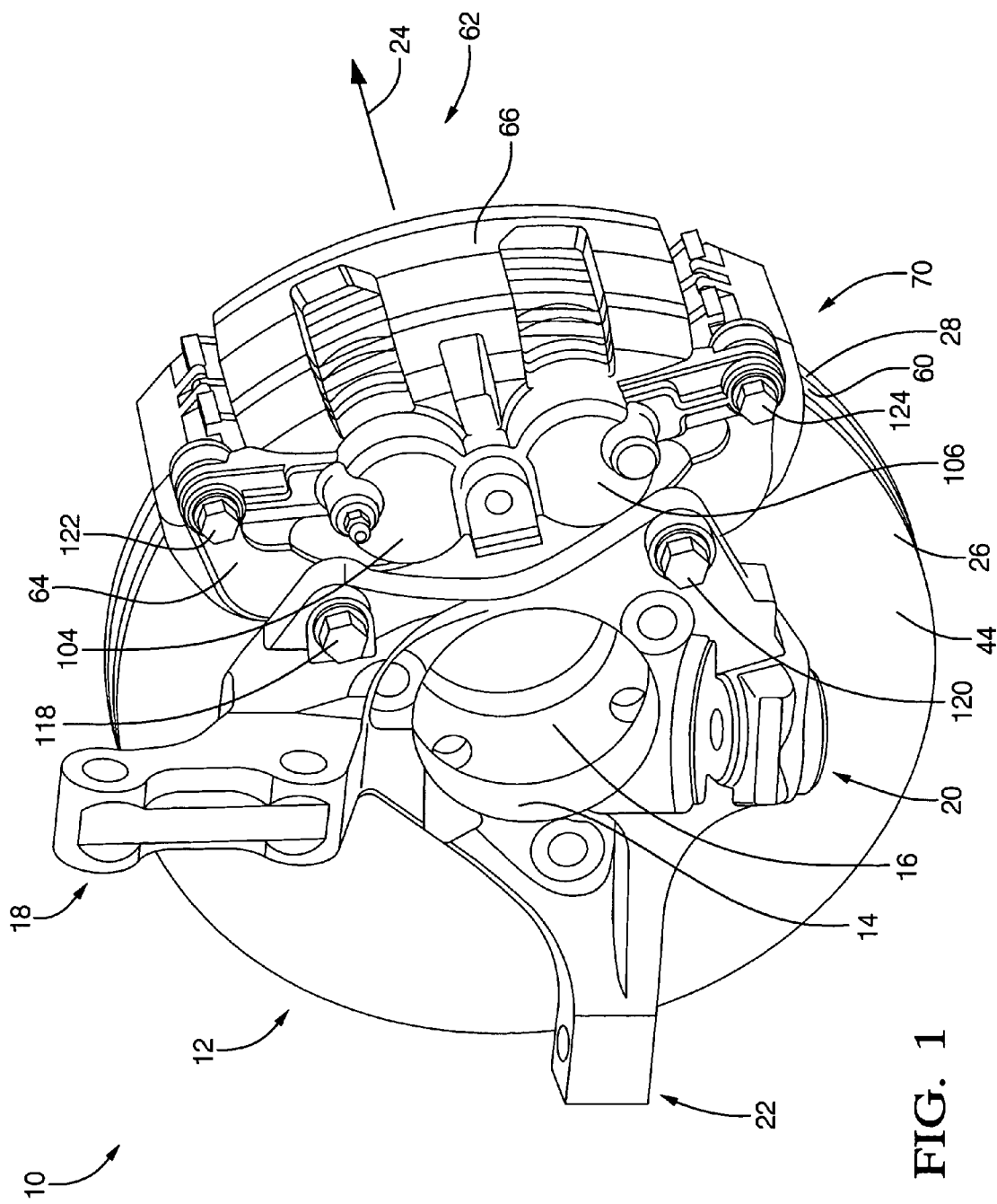
FIG. 1 is a first perspective view of a multi-disc brake according to the exemplary embodiment of the invention.
Figure 2:
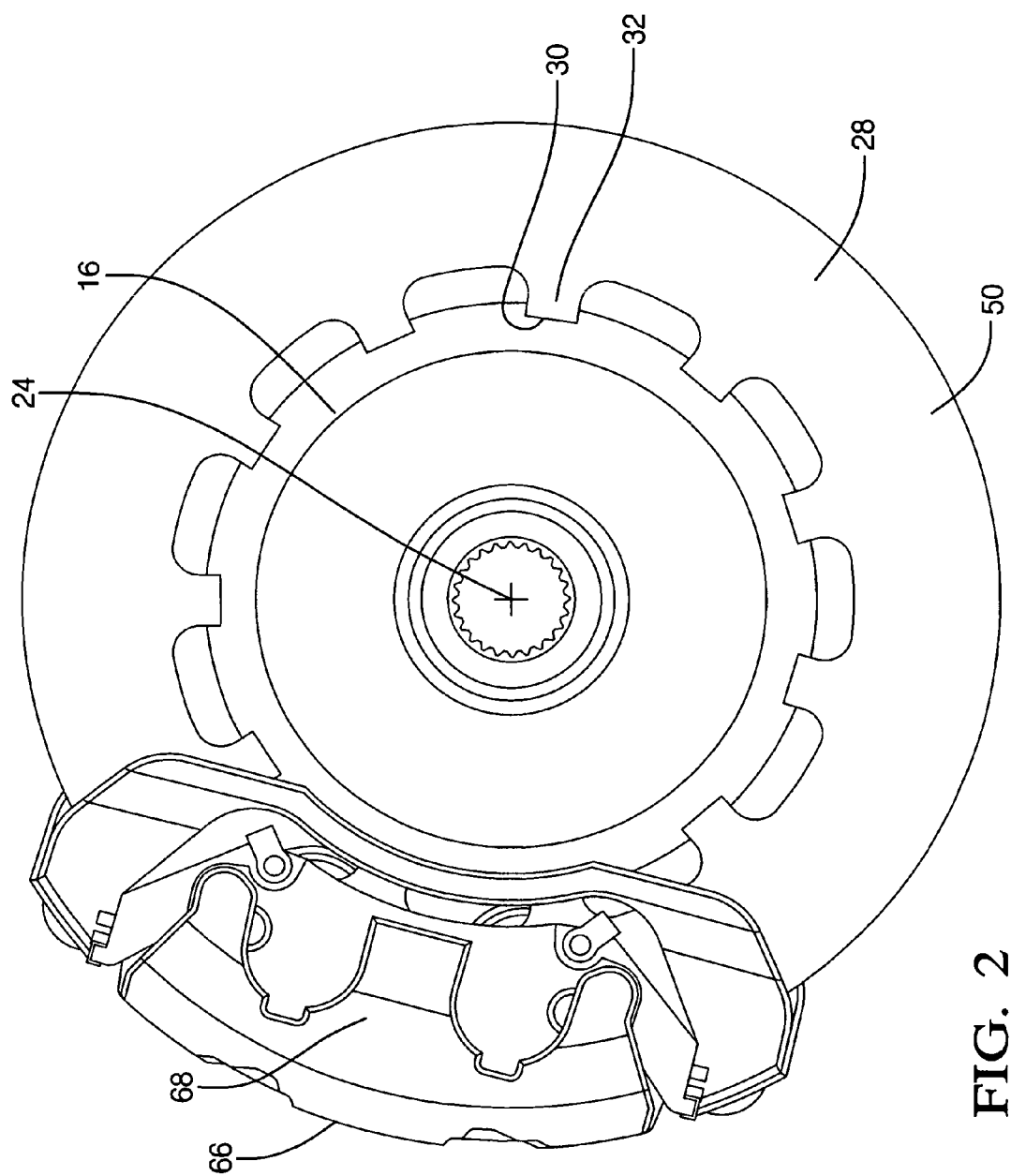
FIG. 2 is a rear view of the multi-disc brake according to the exemplary embodiment of the invention.
Figure 3:
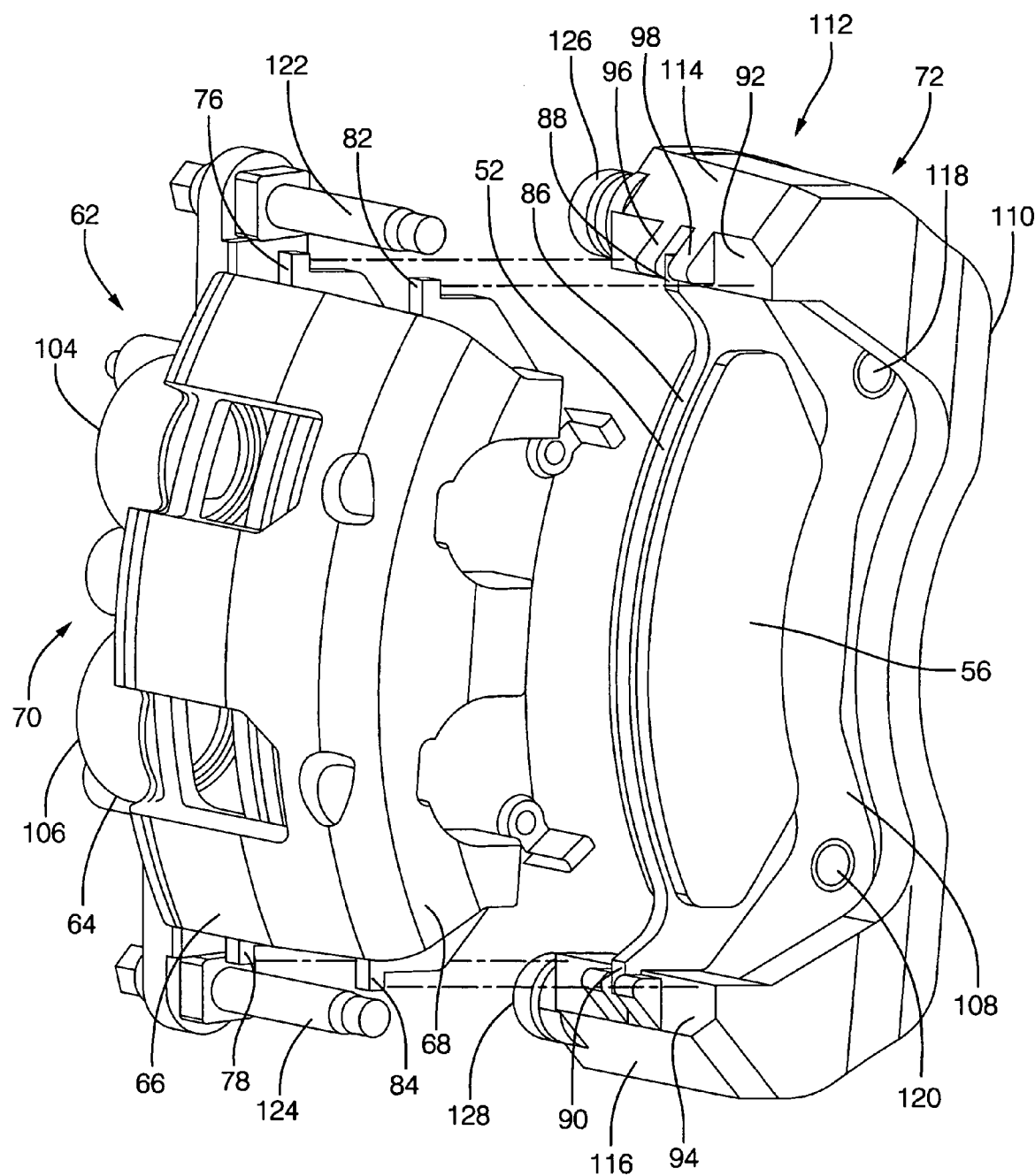
FIG. 3 is an exploded view of a portion of the multi-disc brake according to the exemplary embodiment of the invention.

Referring now to the Figures of the application, a multi-disc brake 10 includes comprises a knuckle 12. The exemplary knuckle 12 is for use in conjunction with a front wheel of a front wheel-drive car. In alternative embodiments of the invention, the knuckle 12 could be disposed adjacent a non-steerable wheel of the vehicle. The knuckle 12 comprises a hollow cylindrical portion 14 which provides support for a hub 16, described in greater detail below. The knuckle 12 also includes structure for mounting the knuckle 12 on a vehicle. The structure of the exemplary knuckle 12 for mounting includes a top mounting portion 18 and a bottom mounting portion 20. Either or both of the top mounting portion 18 and the bottom mounting portion 20 can accommodate a strut and/or a pin of a ball joint to connect the knuckle 12 to a tie bar. The exemplary knuckle 12 also comprises a steering arm 22 for connection to a track rod of the steering system of the vehicle. The knuckle 12 can be a one-piece casting.

The cylindrical portion 14 supports the hub 16 for rotation relative to the knuckle 12 about a rotation axis 24. The hub 16 can be driven by a constant velocity joint which is received in the hub 16 in a conventional manner. Bearings (not visible) can be disposed between the cylindrical portion 14 and the hub 16 to limit friction between the cylindrical portion 14 and the hub 16. The hub 16 supports first and second discs, and inboard disc 26 and an outboard disc 28. The inboard and outboard discs 26, 28 are engaged with the hub 16 to rotate with the hub 16 and to slide relative to the hub 16 along the rotation axis 24. The exemplary inboard and outboard discs 26, 28 are engaged with the exemplary hub 16 by cooperating grooves and tabs, grooves 30 formed in the hub 16 receiving tabs 32 formed by each of the inboard and outboard discs 26, 28.

The multi-disc brake 10 also includes an inboard brake pad assembly 34, an outboard brake pad assembly 36, and a center brake pad assembly 38. The inboard brake pad assembly 34 includes a backing plate 40 and a pad 42 of friction material. The pad 42 is disposed adjacent to a first inboard engaging surface 44 of the inboard disc 26 and engages the surface 44 during braking. The outboard brake pad assembly 36 includes a backing plate 46 and a pad 48 of friction material. The pad 48 is disposed adjacent to a second outboard engaging surface 50 of the outboard disc 28 and engages the surface 50 during braking. The center brake pad assembly 38 includes a backing plate 52 and a first pad 54 disposed on an inboard side of the backing plate 52 and a second pad 56 disposed on an outboard side of the backing plate 52. The pad 54 is disposed adjacent to a first outboard engaging surface 58 of the inboard disc 26 and engages the surface 58 during braking. The pad 56 is disposed adjacent a second inboard engaging surface 60 of the outboard disc 28 and engages the surface 60 during braking.

The multi-disc brake 10 also includes a caliper 62 disposed for sliding movement relative to the knuckle 12. The cooperation between the knuckle 12 and the caliper 62 will be discussed below. The caliper 62 includes an inboard wall 64, a bridge portion 66 extending from the inboard wall 64 around the discs 26, 28 and the brake pad assemblies 34, 36, 38, and an outboard wall 68 adjacent to the outboard brake pad assembly 36.

An actuator 70 is disposed between the inboard wall 64 of the caliper 62 and the inboard brake pad assembly 34. The exemplary actuator 70 includes two apertures (not visible) defined in the inboard wall 64 of the caliper 64. The position of the apertures can be appreciated by the position of two bosses 104, 106 extending inboard from the inboard wall 64. The actuator 70 includes two pistons (not visible), one piston disposed in each aperture. Fluid can be directed to the apertures to move the pistons and urge the inboard brake pad assembly 34 and the inboard wall 64 apart. In response to movement of the pistons, the brake pad assemblies 34, 36, 38 and the discs 26, 28 are urged together to slow rotation of the hub 16. Braking action will be discussed further below.

The multi-disc brake 10 also includes a guide 72 fixed relative to the knuckle 12. The guide 72 includes an inboard wall 108, an outboard wall 110, and a bridge portion 112. The bridge portion 112 connects the inboard wall 108 with the outboard wall 110 and includes a first half 114 and a second half 116. The bridge portion 112 extends around the discs 26, 28. The inboard wall 108 is connected to the knuckle 12 by first and second bolts 118, 120. The caliper 62 is engaged with the guide 72 for sliding movement relative to the rotation axis 24. The caliper 62 is fixed to bolts 122, 124. The bolts 122, 124 slide in apertures 126, 128 defined by the guide 72.

Figure 4:
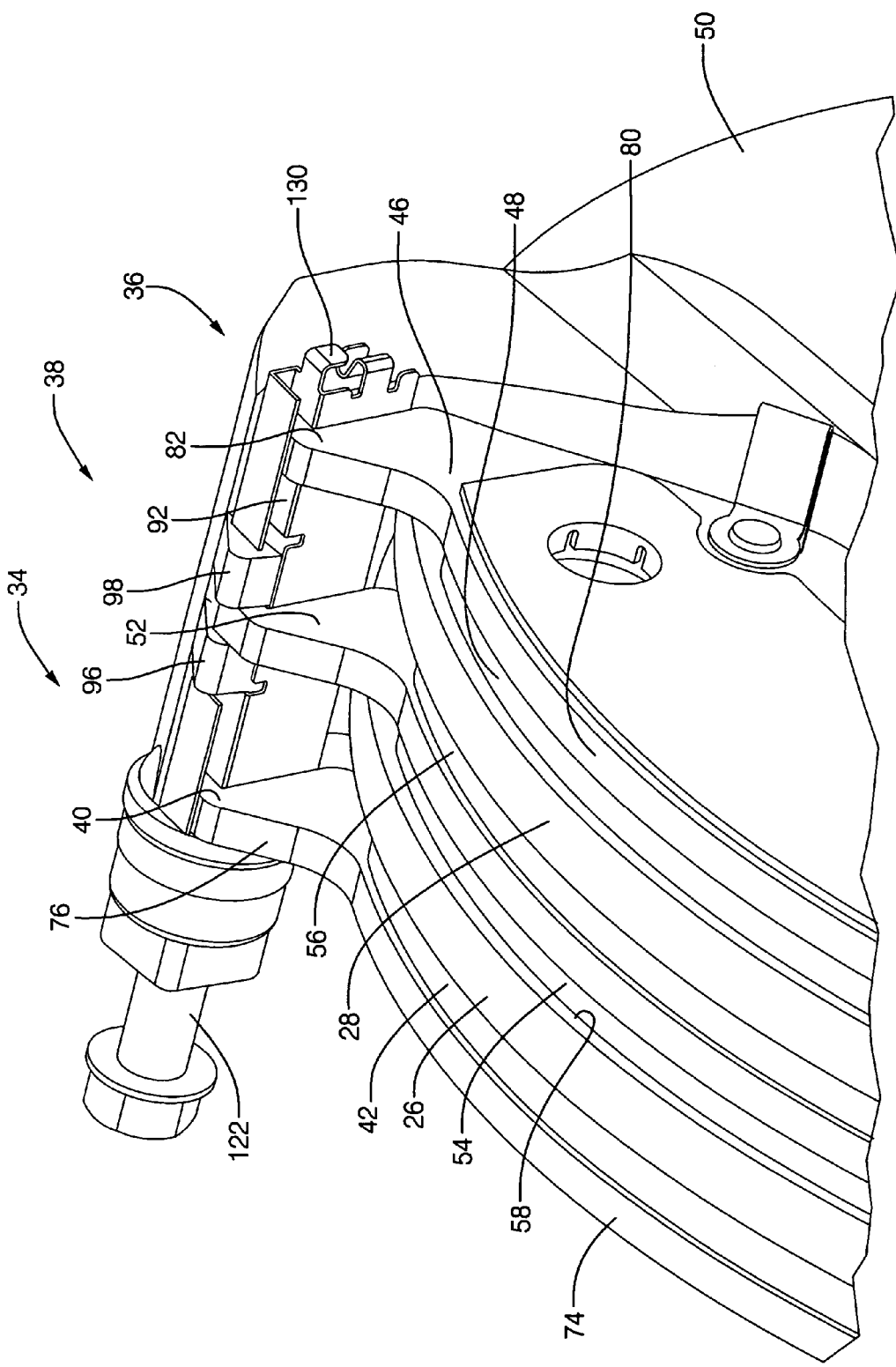
FIG. 4 is a perspective view of a guide of the multi-disc brake according to the exemplary embodiment of the invention.

The guide 72 guides sliding movement of the inboard brake pad assembly 34, and the outboard brake pad assembly 36. The guide 72 includes first and second surfaces 92, 94, defined on said first and second halves 114, 116, respectively. The inboard brake pad assembly 34 includes a first backing plate 40 with a plate portion 74 and first and second arms 76, 78 extending from opposite sides of the first backing plate 40. The arm 76 is received for sliding movement on the surface 92 and the arm 78 is received for sliding movement on the surface 94. The outboard brake pad assembly 36 includes a second backing plate 46 with a plate portion 80 and first and second arms 82, 84 extending from opposite sides of the second backing plate 46. The arm 82 is received for sliding movement on the surface 92 and the arm 84 is received for sliding movement on the surface 94. Retainers, such as retainer 130 shown in FIG. 4, can be affixed to or integral with the guide 72 to limit radially outward movement of the arms 76, 78, 82, 84 relative to the rotation axis 24.

In a braking operation according to the exemplary embodiment of the invention, fluid can be directed to the apertures formed in the inboard wall 64 of the caliper 62 to urge pistons of the actuator 70 outboard against the inboard brake pad assembly 34. The pistons will urge the inboard brake pad assembly 34 against the inboard disc 26 and, further, will urge both the inboard brake pad assembly 34 against the inboard disc 26 outboard against the fixed center brake pad assembly 38. As the inboard brake pad assembly 34 and inboard disc 26 are urged outboard, the inboard wall 64 of the caliper 62 will be urged inboard and will draw the outboard wall 68 inboard as well. As a result, the outboard wall 68 will urge the outboard brake pad assembly 36 and outboard disc 28 against the fixed center brake pad assembly 38.

In the exemplary embodiment of the invention, fixing the center brake pad assembly 38 to the guide 72 limits taper of the brake pad assemblies 34, 36, 38. Also, is has been found that fixing the center brake pad assembly 38 to the guide 72 allows the length of the hub 16 to be reduced since the outboard brake pad assembly 36 and outboard disc 28 move toward the center. It has also been found that fixing the center brake pad assembly 38 to the guide 72 substantially reduces the need for brake abutments on the knuckle 12, simplifying backing plate 40, 46, 52 and knuckle 12 geometries. The knuckle 12 can be formed from alternative materials, such as aluminum.

In the exemplary embodiment of the invention, the center brake pad assembly 38 is held with the projections 96, 98. In alternative embodiments of the invention, the guide 72 can include slots extending inwardly from the surfaces 92, 94 to receive the arms 88, 90 instead of the projections 96, 98 which extend outwardly from the surfaces 92, 94. Also, the Figures of the application show the fixed center brake pad assembly 38 on a sliding caliper 62. In alternative embodiments of the invention, the fixed center brake pad assembly 38 can also be applied to a fixed caliper wherein pistons are located on both the inboard and outboard sides of the brake. The outer and inner pad assemblies will still be guided along a caliper abutment surface and move toward the center (fixed) pad assembly.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multi-disc brake for a vehicle comprising:
   a knuckle for supporting a wheel of a vehicle;
   a hub mounted for rotation on said knuckle about a rotation axis;
   an inboard disc mounted for rotation with said hub and for sliding movement on said hub along said rotation axis and having a first inboard engaging surface and a first outboard engaging surface;
   an outboard disc mounted for rotation with said hub and for sliding movement on said hub along said rotation axis and having a second inboard engaging surface and a second outboard engaging surface;
   an inboard brake pad assembly disposed adjacent to said inboard engaging surface of said inboard disc for sliding movement along said rotation axis relative to said hub;
   an outboard brake pad assembly disposed adjacent to said outboard engaging surface of said outboard disc for sliding movement along said rotation axis relative to said hub;

a center brake pad assembly disposed between said outboard engaging surface of said inboard disc and said inboard engaging surface of said outboard disc;

a caliper having an inboard wall and a bridge portion extending from said inboard wall around said discs and said brake pad assemblies to an outboard wall adjacent to said outboard brake pad assembly;

an actuator for urging said inboard brake pad assembly toward said outboard wall and for urging said outboard brake pad assembly toward said inboard wall to urge said brake pad assemblies and said discs together to slow rotation of said hub; and a guide fixed relative to said knuckle for guiding sliding movement of said inboard brake pad assembly and said outboard brake pad assembly wherein said center brake pad assembly being fixed to said guide for limiting taper of said brake pad assemblies.

2. A multi-disc brake for a vehicle comprising:

a knuckle for supporting a wheel of a vehicle;

a hub mounted for rotation on said knuckle about a rotation axis;

an inboard disc mounted for rotation with said hub and for sliding movement on said hub along said rotation axis and having a first inboard engaging surface and a first outboard engaging surface;

an outboard disc mounted for rotation with said hub and for sliding movement on said hub along said rotation axis and having a second inboard engaging surface and a second outboard engaging surface;

an inboard brake pad assembly disposed adjacent to said inboard engaging surface of said inboard disc for sliding movement along said rotation axis relative to said hub;

an outboard brake pad assembly disposed adjacent to said outboard engaging surface of said outboard disc for sliding movement along said rotation axis relative to said hub;

a center brake pad assembly disposed between said outboard engaging surface of said inboard disc and said inboard engaging surface of said outboard disc;

a caliper disposed for sliding movement relative to said knuckle and having an inboard wall and a bridge portion extending from said inboard wall around said discs and said brake pad assemblies to an outboard wall adjacent to said outboard brake pad assembly;

an actuator disposed between said inboard wall of said caliper and said inboard brake pad assembly for urging said inboard brake pad assembly and said inboard wall apart to urge said brake pad assemblies and said discs together to slow rotation of said hub; and a guide fixed relative to said knuckle for guiding sliding movement of said inboard brake pad assembly and said outboard brake pad assembly wherein said center brake pad assembly being fixed to said guide for limiting taper of said brake pad assemblies.

3. The multi-disc brake of claim 2 wherein:

said inboard brake pad assembly includes a first backing plate with a plate portion and first and second arms extending from opposite sides of said first backing plate;

said outboard brake pad assembly includes a second backing plate with a plate portion and first and second arms extending from opposite sides of said second backing plate;

said center brake pad assembly includes a third backing plate with a plate portion and first and second arms extending from opposite sides of said third backing plate; and said guide includes first and second surfaces opposed from one another receiving said first and second arms of each of said backing plates and also includes first and second projections extending from said first surface on opposite sides of said first arm of said third backing plate and third and fourth projections extending from said second surface on opposite sides of said second arm of said third backing plate.

4. The multi-disc brake of claim 3 wherein said first and second projections limit movement of said first arm of said third backing plate along said first surface and said third and fourth projections limit movement of said second arm of said third backing plate along said second surface.

5. The multi-disc brake of claim 2 wherein said guide includes first and second surfaces guiding sliding movement of said inboard brake pad assembly and said outboard brake pad assembly relative to said knuckle.

6. The multi-disc brake of claim 5 wherein said guide receives said center brake pad assembly on said first and second surfaces.

7. The multi-disc brake of claim 6 wherein said guide includes a plurality of projections extending for said first and second surfaces, at least two projections on each side of said center brake pad assembly.

* * * * *